United States Patent

Ataka et al.

[15] 3,641,900
[45] Feb. 15, 1972

[54] PARALLAX CORRECTION DEVICE FOR USE IN A MULTIPHOTOGRAPHIC DEVICE

[72] Inventors: Hisanori Ataka; Nobunao Mikami, both of Kawasaki-shi, Japan

[73] Assignee: Kabushiki Kaisha Ricoh, Tokyo, Japan

[22] Filed: Oct. 25, 1968

[21] Appl. No.: 770,754

[30] Foreign Application Priority Data

Nov. 4, 1967 Japan....................................42/70850
Nov. 4, 1967 Japan....................................42/70851

[52] U.S. Cl. .........................................................95/36 R
[51] Int. Cl. .........................................................G03b 19/02
[58] Field of Search.....................................95/36; 352/207

[56] References Cited

UNITED STATES PATENTS 1,782,860   11/1930   Reipert ..........................352/207 UX

FOREIGN PATENTS OR APPLICATIONS 150,235   0/1962   U.S.S.R. ..................................95/36

*Primary Examiner*—Samuel S. Matthews
*Assistant Examiner*—Monroe H. Hayes
*Attorney*—Burgess, Ryan and Hicks

[57] ABSTRACT

A parallax correction device for use in a multiphotographic device wherein a plurality of movable plates or frames having slots are disposed in an optical system of a viewfinder in order to determine the scope or portion of an object or scene to be photographed in response to the movement of a pair of movable plates which are adapted to move in the directions at right angles relative to each other so as to form an aperture for photographing and/or to the movement of means for adjusting the photographing distance.

9 Claims, 4 Drawing Figures

PATENTED FEB 15 1972
3,641,900
SHEET 1 OF 2
FIG. 1
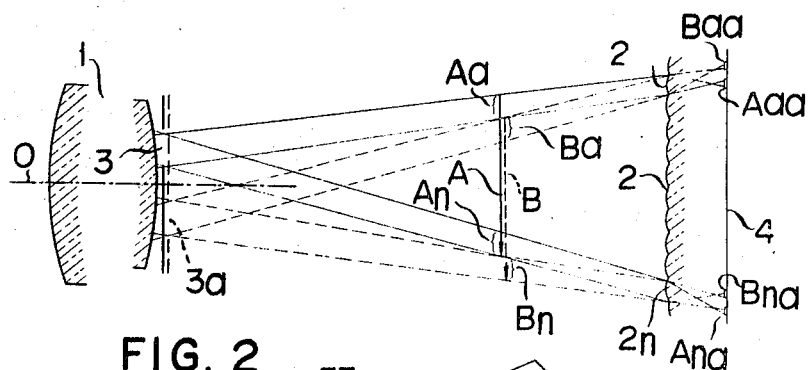
FIG. 2
FIG. 3
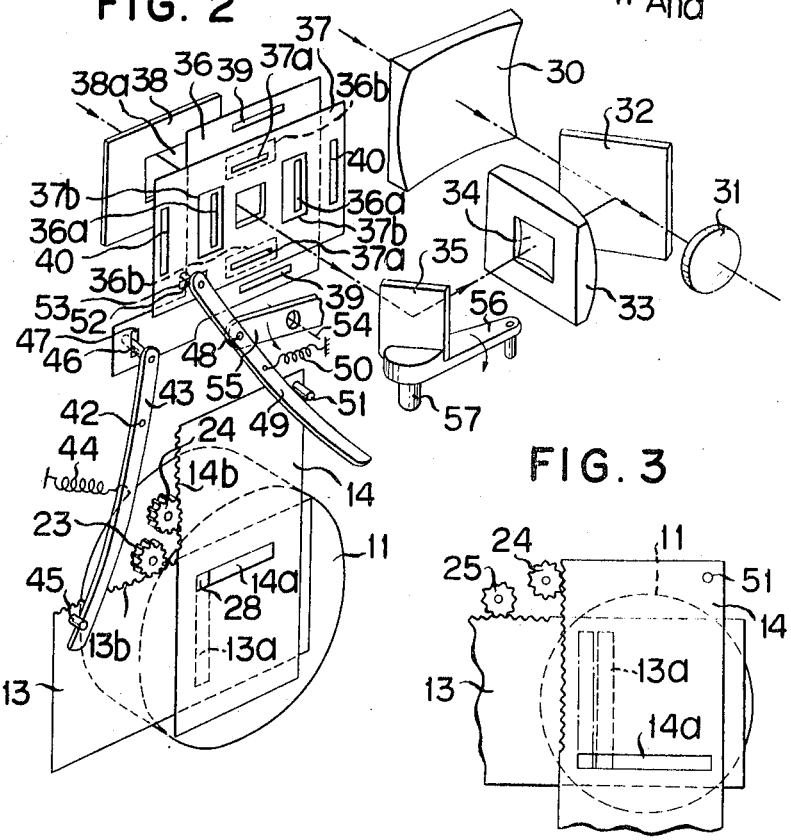
INVENTORS
Hisanori Ataka
Nobunao Mikami
BY
Burgess Ryan + Hicks
ATTORNEYS

PARALLAX CORRECTION DEVICE FOR USE IN A MULTIPHOTOGRAPHIC DEVICE

BACKGROUND OF THE INVENTION

The present invention relates to a multiphotographic device and more particularly to a parallax correction device for use in a multiphotographic device.

The multiphotographic device is a device in which an image of an object to be photographed is divided into a plurality of finely split images which in turn are recorded upon predetermined positions of a single sensitive material as a multitude of distributed images; another image of another object is also divided into a plurality of finely split images which in turn are recorded upon other predetermined positions of the same sensitive material as another multitude of distributed images; and this photographing operations are repeated as many times as required in the same manner as described above. A microlens group is used as means for finely splitting an image of an object while an aperture disposed in closely spaced-apart relation with or within a photographic lens is used as means for preventing each of finely split images of each image of each object from overlapping each other. In other words, the position of an aperture relative to the photographic lens is displaced whenever one object is photographed so that the images to be recorded upon the sensitive material are prevented from being overlapped.

However, there is a defect that since the relative position of the aperture with respect to a viewfinder system is varied whenever this aperture is displaced from one position to another, the image to be recorded in the sensitive material through the aperture is different from that viewed through the viewfinder whenever photographed, that is whenever the position of the aperture is displaced. Furthermore, when the distance is varied, the angle of view of the image through the photographic lens is different from that through the viewfinder so that the portion of the object to be recorded or photographed is different from that viewed through the viewfinder.

Therefore, it is desired that the viewfinder optical system be corrected so that the portion of the subject to be viewed through the viewfinder always exactly coincides with the image to be recorded ro photographed.

SUMMARY OF THE INVENTION

An object of the present invention is to provide a device which corrects a parallax as described above.

Another object of the present invention is to provide a parallax correction device for use in multiphotographic device which is simple in construction and reliable in operation with sufficient accuracy.

Briefly, in accord with one embodiment of the present invention, a photographing aperture is formed by a pair of elongated slots where they intersect with each other, each of said elongated slots being formed in a different one of a pair of movable plates which are moved at right angles relative to each other. The displacement of said photographing aperture from one position to another is effected by moving one or both of said pair of movable plates. In order to delimit the portion of an object to be photographed, a second pair of movable viewfinder frames or plates which have four slots and are disposed in the optical system of the viewfinder are utilized, and said slots are formed in said second pair of movable viewfinder plates which are thin and opaque and superposed upon one an other and are moved in the directions at right angles relative to each other. The movable thin viewfinder plate which is movable in the vertical direction is interconnected or interlocked with one of said movable, photographing aperture forming plates which is movable in the vertical direction. In the similar manner, the movable thin viewfinder plate which is movable in the horizontal or transverse direction is interconnected or interlocked with the other movable, photographing aperture forming plate which is movable in the horizontal or transverse direction. Said vertically movable thin opaque plate is also moved vertically in connection with the rotation of a reflecting mirror which is used for measuring a distance from the photographic device to an object to be photographed, whereby the parallax is corrected.

The present invention will be further described in connection with the accompanying drawing. However, it is to be understood that such illustration and explanation is by way of exemplification and the present invention is not limited thereby, except to the extent set forth in the appended claims.

BRIEF DESCRIPTION OF THE DRAWINGS

FIG. I is an explanatory view of a multiphotographic device;
FIG. 2 is a perspective view of a parallax correction device of one embodiment of the present invention;
FIG. 3 is a rear view thereof only illustrating means for selecting the aperture position.

DESCRIPTION OF THE PREFERRED EMBODIMENT

Figure 4:
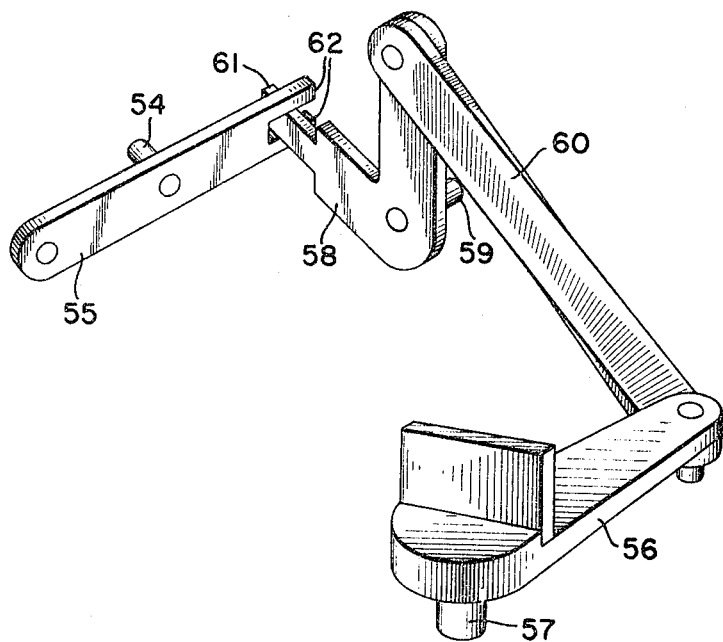
FIG. 4 is a perspective view of a linkage employed in the invention.

As shown in FIG. 1, the optical system of the multiphotographing device is comprised of a relatively large first lens 1, a second lens 2 and an aperture 3 disposed immediately behind the first lens. The second lens 2 is comprised of a plurality of microlenses which are integrally arranged and disposed so as to form a lattice consisting of the rows and columns of the microlenses. Thus, the second lens serves to split the inverted image produced by the first lens into a plurality of images and to focus upon a photosensitive material 4 the real not-inverted split images thereof. The aperture 3 is so arranged and disposed that the aperture 3 can move vertically and transversely in the plane which is substantially perpendicular with respect to the optical axis O of the first lens. Thus, the aperture 3 serves to determine the position upon the sensitive material 4 of each of the infinitesimal portions of the image produced by the first lens which is focused thereon by each of the microlenses constituting second lens 2.

The same effect can be also attained when the aperture 3 is arranged and disposed immediately before or within the first lens 1. Furthermore, the sensitive material arranged and disposed backwardly of the second lens 2 may be alternatively disposed at the back surface of the second lens if the back surface is the focal plane of the second lens. Alternatively, the sensitive material 4 may be spaced apart from the second lens 2 by a suitable distance.

When an inverted image A of an object is focused by the first lens between the first lens 1 and the second lens 2, a split portion A$a$ of the image A whose light rays are made incident upon one microlens element 2$a$ of the second lens 2 is focused as not-inverted image A$aa$ upon the sensitive material 4. In a similar manner, the light rays including another portion A$n$ of the image A through the aperture 3 are made incident upon another microlens element 2$n$ of the second lens 2 so as to focus upon the sensitive material a split image A$na$.

When the aperture 3 is displaced to the position indicated by 3$a$ and when the first lens 1 is directed toward another object, the image of this another object can be produced as shown by reference numeral B. One portion B$a$ of the image B included in the light rays coming from the aperture 3$a$ is focused as not-inverted real image B$aa$ upon the sensitive material 4 through the above-described microlens element 2$a$ of the second lens 2. In a similar manner, another portion B$n$ of the image B included in the light rays coming from the aperture 3$a$ and being made incident upon the above-described microlens element 2$n$ is focused as not-inverted real image B$na$ upon the sensitive material 4.

Furthermore, when the aperture is displaced to a intermediate position between the positions 3 and 3$a$, the split images of an image produced are focused upon the not-exposed portion of the sensitive material, that is the intermediate portion between the portions of the sensitive material which have been already exposed by the light rays coming through the aperture positions 3 and 3a. When the aperture is displaced every time a photograph is made, it is required that the position to which the aperture is displaced is not superimposed upon a position at which the aperture has already been located during a previous photography step.

In the photographing device of the type described above, the number of pictures to be photographed is determined by the ratio of the total exposure area when the shield plate having the aperture is removed to the exposure area of the aperture. That is, the number of pictures to be photographed upon a single sensitive material can be determined by the ratio of the effective area of the first lens located at the position of the aperture to the effective area of the aperture. Assuming that the effective diameter of the first lens at the position of the aperture be 30 mm. and its focal length 95 mm., the distance between the aperture and the image focused by the first lens be 30 mm., the distance between the aperture and the second lens be 40 mm., the aperture be 2 mm. × 2 mm., and the displacement pitch both in the vertical and transverse directions be 3 mm., then 49 pictures can be photographed by displacing the aperture in seven steps in either direction.

The images of the objects obtained by the multiphotographing device of the type described above are distributed over a single area of sensitive material in finely split form, so that it is impossible to see what kind of objects are recorded thereupon.

The recorded images can be reproduced with the image reproduction optical system similar to the system of the multiphotographing device by reversing the light rays in direction. As is clear from FIG. 1, the image A produced through the aperture 3 and the image B produced through the aperture 3a are focused at positions which are displaced relative to each other by a distance corresponding to the distance between said two aperture positions 3 and 3a. Since the positions of images produced through differently positioned apertures are themselves different, the portions of the objects photographed which are recorded on the sensitive material are, in general, different from those viewed through the viewfinder. That is, whenever the photographing aperture is displaced the image recorded changes. If an ordinary viewfinder is employed it cannot be positioned to give a correct view at all positions of the aperture.

Briefly, an object of the present invention is to provide a parallax correction device in which the orientation of the multiphotographic device is slightly varied in response to the change of the position in the vertical and horizontal directions of the image during successive photographing steps whereby the deviation of the image to be recorded in the sensitive material from the image of the subject viewed through the finder due to the displacement of the aperture can be avoided.

The present invention will be clearly understood from the following description of one preferred embodiment thereof with reference to the accompanying drawing.

In FIG. 2, reference numeral 11 designates a first lens; 13, a movable plate having an elongated slot 13a whose width is equal to the length of one side of a square aperture, said plate being permitted only to move in the horizontal direction in a plane which is perpendicular with respect to the optical axis of the first lens 11; and 14, a second movable plate having an elongated slot 14a whose dimensions are identical to those of the elongated slot 13a, said plate being permitted to move only in the vertical direction in said plane. Therefore, when the aforementioned two elongated slots 13a and 14a intersect with each other at right angles, a square aperture 28 is formed. Pinions 23 and 24 which are in mesh with racks 13b and 14b are disposed at an edge of the movable plates 13 and 14, respectively, and serve to displace the movable plates in the predetermined directions.

The movable plate 14 is displaced downwardly in stepwise by a distance which is slightly longer than the width of the elongated slot 14a. On the other hand, the movable plate 13 is held stationary until the elongated slot 14a of the movable plate 14 is moved to the lowermost aperture forming position thereof. After a photograph is made through the aperture formed by the lowermost position of the elongated slot 13a and the leftmost position of the elongated slot 14a, the movable plate 13 is displaced in one step toward the right as shown in FIG. 3 and then the movable plate 14 is displaced stepwise upwardly from the lowermost aperture-forming position of the elongated slot 13a toward the uppermost position thereof. Thus, the objects or scenes are recorded on the same sensitive material which is held stationary, by moving one step the movable plate 13 whenever one upward or downward stroke of the movable plate 14 is completed.

The number of pictures photographed upon the same sensitive material is determined by the product of a number of steps of the elongated slot 13a from one end toward the other end thereof and a number of steps of the elongated slot 14a in one downward or upward stroke thereof. For example, when it is assumed that the number of steps of each elongated slot be seven, then 49 objects or scenes are recorded on the same sensitive material.

Reference numeral 30 designates an objective of a viewfinder; 31, an eyepiece; 32, a semitransparent mirror which is inclined by 45° with respect to the optical axis of the objective 30; 33, a convex lens having a concave lens disposed at the center portion thereof; and 35, a movable reflecting mirror for measuring the distance from the camera to an object or scene. A pair of opaque movable thin viewfinder plates 36 and 37 superposed on one another are disposed forwardly of the aforementioned reflecting mirror 35, a light window 38 having a center-apertured hole 38a is disposed forwardly of the movable plate 36. One movable viewfinder plate 36 has a pair of vertical slots 36a which are parallel with each other and a pair of rectangular, upper and lower apertures 36b each having a relatively wider width and which are parallel with each other. The other movable viewfinder plate 37 has a pair of horizontal slots 37a which are parallel with each other and a pair of right and left rectangular apertures 37b each having a relatively wider width and which are parallel with each other. Furthermore, the movable viewfinder plate 36 has a pair of horizontal upper and lower guide slots 39 so that said viewfinder plate 36 may be permitted to move only in the horizontal direction by means of the aforementioned guide slots 39 and pins (not shown) fixed to a stationary member (not shown) of the photographic device and fitted into these guide slots 39 respectively. In the similar manner, the other movable viewfinder plate 37 has a pair of vertical right and left guide slots 40 so that said viewfinder plate 37 may be permitted to move only in the vertical direction by means of said guide slots 40 and pins (not shown) fixed to a stationary member (not shown) of the photographic device and fitted into the guide slots 40 respectively. Both of the movable viewfinder plates 36 and 37 are center-apertured for measuring the distance, and the coincidence of the image obtained through the objective 30 with that obtained through the aforementioned apertures can be attained by rotating the reflecting mirror 35 through a small angle in connection with the manipulation of the rangefinder, whereby the precise distance from the photographic device to an object or scene can be measured.

The movable viewfinder plate 36 is interconnected with the movable plate 13 through an interconnecting member 43 which is swingable about a pivot positioned at a suitable portion of the photographic device. The lower portion of the interconnecting member 43 is pressed against a pin 45 provided upon the movable plate 13 by means of a spring 44 while a pin 46 fixedly secured to the upper end portion of the interconnecting member 43 is loosely fitted into an elongated slot 47 provided in the movable viewfinder plate 36. Therefore, whenever the movable plate 13 is displaced upon photographing, the movable viewfinder plate 36 is also caused to move horizontally so that the positions of the pair of slots 36a are displaced, whereby the portion of an object or scene bordered by slots 36a as seen in the viewfinder is deviated in the horizontal or transverse direction, thereby correcting for the deviation of the image of the object or scene being photographed caused by the horizontal or transverse movement of the aperture position.

On the other hand, in a similar manner as described above, an interconnecting member 49 which is swingable about a pivot 48 is pressed against a pin 51 provided upon the movable plate 14 by means of a spring 50 while a pin 52 securely fixed to the upper portion of the interconnecting member 49 is loosely fitted into an elongated slot 53 provided in the moveable viewfinder plate 37. Therefore, whenever the movable plate 14 is displaced upon photographing, the movable viewfinder plate 37 is also caused to move in the vertical direction so that the positions of the pair of slots 37a are displaced, whereby the portion of the object or scene bordered by slots 37a as seen in the viewfinder is deviated in the vertical direction, thereby correcting for the deviation of the image of the object or scene being photographed caused by the vertical movement of the aperture position. Rectangular apertures 37b are sufficiently wide to allow the passage of light through slots 36a at all positions of said slots, and rectangular apertures 36b are similarly made sufficiently wide to avoid blocking elongated slots 37a during movements of the latter.

The pivot 48 of the interconnecting member 49 is disposed at one end of a rocking member 55 pivoted by means of a pivot 54 to the stationary member of the photographic device, and this rocking member 55 is interlocked with a supporting arm 56 of the reflecting mirror or an element which is adapted to rotate this reflecting mirror 35. The supporting arm 56 is rotatable about a pivot 57 and is adapted to swing in connection with the forward or backward movement of the first lens 11 during focusing so that the direction of the reflecting mirror 35 is changed. Furthermore, the rocking member 55 is interconnected or interlocked with the supporting arm 56 and is adapted to rotate about the pivot 54 so that the position of the pivot 48 of the interconnecting member 49 is displaced, whereby the pairs of slots 37a can be moved toward the photographic lens as the focus is changed from a far to a near object, thereby correcting the parallax caused by the variation of the photographing distance. When the photographing distance becomes shorter, both of the supporting arm 56 and the rocking member 55 are rotated in the direction indicated by the arrows. This motion may be achieved by means of a linkage such as that shown in FIG. 4. In the FIG. 4 linkage a push rod 60 is pivotally connected to the outer end of the supporting arm 56 and extends to one arm of a bellcrank 58 which is pivoted about pin 59. The other arm of the bellcrank has its outer end formed into a projection 61 which engages with a notch defined by ears 62, 62 on one end of the rocking member 55.

It is to be understood that variations and modifications of the mechanism which is adapted to interlock each movable plate with its corresponding pair of slots disposed in the optical system of the viewfinder in order to determine the portion or scope of an object or scene can be effected without being limited only to the mechanism as described hereinabove with reference to the accompanying drawing.

We claim:

1. A parallax correction device for use in a multiphotographic device having a photographic lens comprising
   a first pair of adjacent substantially parallel movable plates each having an elongated slot said elongated slots being perpendicular to each other and overlapping, thereby forming an aperture;
   means for moving each of said pair of movable plates along a linear path which is perpendicular to the respective elongated slot, thereby changing the position of the aperture relative to the lens;
   a second pair of movable plates disposed in the optical system of a viewfinder and each of said second pair of movable plates having slots for delimiting the portion of an object or scene to be photographed; and
   interlocking means interconnecting said first and said second pairs of movable plates for moving respective ones of said second pair of movable plates in directions opposite to the directions of movement of said first pair of movable plates when said first pair of movable plates are moved so as to form an aperture.

2. The device of claim 1 comprising a second interlocking means adapted to move toward or away from said photographic lens the movable plates disposed in the optical system of the viewfinder when an adjustment of the photographing distance is made.

3. A parallax correction device for use in a multiphotographic device comprising
   a lens;
   a pair of adjacent substantially parallel movable plates each having an elongated slot, said elongated slots being perpendicular to each other and overlapping, thereby forming an aperture;
   means for moving each of said pair of movable plates along a linear path which is perpendicular to the respective elongated slot, thereby changing the position of the aperture relative to the lens;
   indicating means for indicating the portion of an object being photographed which will be imaged on the image plane of the lens;
   means for adjusting the indicating means in accordance with movement of the photographing aperture and thereby varying the portion of the object being photographed which is indicated by the indicating means; and
   means for adjusting the indicating means in accordance with the focusing adjustment of the lens and thereby compensating for parallax errors due to differences between the location of the lens axis and the point of view of the indicating means;
   said focus-adjusting means comprising a mirror adapted for rotative movement by said focusing adjustment and a linkage interconnecting said mirror with said indicating means for transmission of said movement thereto.

4. A parallax correction device for use in a multiphotographic device comprising:
   a photographing lens having an optical axis;
   an opaque first moveable plate disposed in the path of light travelling through the lens from the object being photographed to the image plane of the lens;
   an opaque second movable plate disposed adjacent to and substantially parallel to the first movable plate;
   means for constraining the first movable plate to move back and forth only in a first direction transverse to the optical axis of the lens;
   means for constraining the second movable plate to move back and forth only in a second direction transverse to the first direction and transverse to the optical axis of the lens;
   a first slot in the first movable plate extending transversely to the first direction;
   a second slot in the second movable plate extending transversely to the second direction and to the first slot, said first and second slots crossing to define a photographing aperture positioned in the path of light travelling through the lens from the object being photographed to the image plane of the lens, said photographing aperture being sufficiently small to be displaceable between a plurality of nonoverlapping positions within said light path as a result of movement of a movable plate;
   a viewfinder having an optical axis;
   a movable first indicator visible in the viewfinder aligned to delimit those borders of the object being photographed which extend perpendicularly to the first direction;
   a movable second indicator visible in the viewfinder aligned to delimit those borders of the object being photographed which extend perpendicularly to the second direction;
   means for moving the first indicator in a direction opposite to the direction of movement of the first movable plate upon motion of said first movable plate; and
   means for moving the second indicator in a direction opposite to the direction of movement of the second movable plate upon motion of said second movable plate.

5. The device of claim 4 in which the first direction is substantially parallel to a line between the optical axis of the lens and the optical axis of the viewfinder and comprising means for moving the first indicator in the first direction in response to changes in focus of the photographing lens and thereby correcting for parallax errors caused by the separation of the optical axes of the lens and the viewfinder.

6. The device of claim 4 wherein the first and second indicators comprise parallel adjacent opaque plates pierced by slots, said slots allowing the passage of light therethrough into the viewfinder.

7. The device of claim 4 wherein the means for moving the first indicator upon motion of the first movable plate comprises a lever extending between the first movable plate and the first indicator and rotatable about a pivot axis intermediate the first movable plate and the first indicator.

8. The device of claim 7 comprising means to vary the position of the pivot axis in response to changes in the position of the lens during focusing and thereby to move the first indicator in the first direction for the correction of parallax errors caused by the separation of the optical axes of the lens and the viewfinder.

9. The device of claim 7 wherein the means for moving the second indicator upon motion of the second movable plate comprises a lever extending between the second indicator and the second movable plate and rotatable about a pivot axis intermediate the second movable plate and the second indicator.

* * * * *